United States Patent
Elteto

(10) Patent No.: US 9,098,676 B2
(45) Date of Patent: Aug. 4, 2015

(54) SYSTEM AND METHODS FOR DETECTING ROLLBACK

(75) Inventor: Laszlo Elteto, Irvine, CA (US)

(73) Assignee: SafeNet, Inc., Belcamp, MD (US)

( * ) Notice: Subject to any disclaimer, the term of this patent is extended or adjusted under 35 U.S.C. 154(b) by 1995 days.

(21) Appl. No.: 12/148,189

(22) Filed: Apr. 16, 2008

(65) Prior Publication Data

US 2009/0265348 A1   Oct. 22, 2009

(51) Int. Cl.
| | |
|---|---|
| *G06F 17/00* | (2006.01) |
| *G06F 21/10* | (2013.01) |
| *G06F 21/57* | (2013.01) |
| *G06F 17/30* | (2006.01) |

(52) U.S. Cl.
CPC .......... *G06F 21/10* (2013.01); *G06F 17/30371* (2013.01); *G06F 21/57* (2013.01); *G06F 17/30489* (2013.01); *G06F 17/30501* (2013.01); *G06F 2221/0775* (2013.01)

(58) Field of Classification Search
CPC ............... G06F 17/30289; G06F 17/30575; G06F 17/30091; G06F 17/30371; G06F 17/3007; G06F 17/302; G06F 17/30489; G06F 17/30501; G06F 11/1448; G06F 11/1469; G06F 11/1402; G06F 11/2094; G06F 11/1461
USPC ............... 707/682, 674, 640, 999.2, 999.201, 707/999.202, 999.204
See application file for complete search history.

(56) References Cited

U.S. PATENT DOCUMENTS

| | | | |
|---|---|---|---|
| 5,640,561 A * | 6/1997 | Satoh et al. ............................. 1/1 |
| 6,651,077 B1 * | 11/2003 | East et al. ............................. 1/1 |
| 7,308,542 B1 | 12/2007 | Chicks et al. | |
| 7,765,361 B2 * | 7/2010 | Dhamankar et al. .......... 711/135 |
| 2003/0115469 A1 | 6/2003 | Shippy et al. | |
| 2004/0267809 A1 * | 12/2004 | East et al. .................. 707/104.1 |
| 2005/0027725 A1 * | 2/2005 | Kagalwala et al. ............ 707/100 |
| 2006/0174326 A1 * | 8/2006 | Ginter et al. ....................... 726/3 |
| 2006/0218204 A1 * | 9/2006 | Ofer et al. ..................... 707/201 |
| 2007/0038682 A1 * | 2/2007 | Kulesza et al. ............... 707/202 |
| 2007/0136380 A1 * | 6/2007 | Kulesza et al. ............... 707/200 |
| 2007/0162516 A1 * | 7/2007 | Thiel et al. .................... 707/201 |
| 2007/0220032 A1 * | 9/2007 | Kapoor et al. ................. 707/102 |
| 2007/0239948 A1 | 10/2007 | Muraki et al. | |
| 2008/0002576 A1 * | 1/2008 | Bugenhagen et al. ......... 370/229 |
| 2008/0201390 A1 * | 8/2008 | Anguelov ..................... 707/204 |
| 2008/0278294 A1 * | 11/2008 | Konuma .................... 340/10.41 |

FOREIGN PATENT DOCUMENTS

EP          0679980 A1     4/1995

* cited by examiner

*Primary Examiner* — Dung K Chau
(74) *Attorney, Agent, or Firm* — Drinker Biddle & Reath LLP

(57) ABSTRACT

In an embodiment of a method of and system for detecting rollback of usage data, the usage data is recording in a database. A sequence value in the database is repeatedly advanced. A copy of the sequence value is repeatedly saved to protected storage. The copy of the sequence value in the protected storage is compared with the sequence value in the database, and it is determined whether the result of the comparison is consistent with normal operation of the database since the previous save to protected storage.

18 Claims, 2 Drawing Sheets

SYSTEM AND METHODS FOR DETECTING ROLLBACK

BACKGROUND

The disclosure relates to detecting or preventing "rollback," that is to say, restoration of a system to an earlier state, and especially to preventing the use of rollback to evade a restriction on the repeated or continued use of a resource.

Many computer-readable resources, including computer programs, databases, and media and other data files, are provided to an end-user under a license that quantitatively limits the use of the resource. For example, use may be limited to a specified number of executions of a program, or a specified number of pages printed. In order to keep track of the usage, data that records the usage is saved. For example, a program may maintain a sequence number or counter that increases to a limit or decreases to zero.

However, if the license and usage data are saved as ordinary working data by the program to which they relate, or by a program accessing the data to which they relate, an astute and unscrupulous user could take a copy of the data shortly after the program is first installed and, at a later time when the usage limit is reached, restore the usage data from that copy to the earlier state, thus fooling the program into thinking the usage limit has not been reached, and circumventing the limit. Even the not particularly expert user can sometimes achieve this result by uninstalling and reinstalling the program.

To prevent this circumvention, some programs hide the usage data in places, for example, an area normally reserved to the operating system or an area entirely outside a disk partition of a hard disk drive, where the data are not easily accessible or editable by the ordinary user. Some programs save the usage data as "persistence data" that remain on the system even if the controlling program is uninstalled. However, especially in a large system where licensing is managed centrally from a server, the constant updating of the hidden usage data for all the supported instances of all the supported programs or data can create a burden to slow down the license server.

SUMMARY

A method is disclosed for tracking usage data in which usage data comprising a sequence number or other sequence value is saved in a first record as usage occurs. Less frequently, the sequence number is saved to protected (hidden, inaccessible, and/or persistent) storage. From time to time, the sequence number in the usage data is compared with the sequence number in the protected storage. If the sequence number in the usage data is earlier than the sequence number in the protected storage, then it is inferred that a rollback has taken place, and appropriate measures can be taken. If the sequence number in the protected storage is completely different from the sequence number in the usage data, or is missing or corrupted, then it is inferred that tampering may have taken place, and appropriate measures can be taken.

The usage data may be saved in fast, easily accessible storage, for example, local storage on the computer actually running the program that is tracking usage. Alternatively, the usage data and sequence numbers for one or more licenses may be stored on a central license server, but in a location that is faster to access than the protected storage. Usage data for multiple licenses, or multiple users of a multi-user license, may then be stored in a single database, with a common sequence number. The usage data may be saved every time an event occurs that affects the usage data or (for example, where elapsed time is relevant) at suitable time intervals, or a combination. The usage data may be saved in a database, which may be part of a database being used for working data by the program.

The sequence number may comprise part of the usage data. For example, where the usage data comprises a counter for the number of times a specific event has occurred, the sequence number may comprise that number. Alternatively, the sequence number may be a distinct number appended to the usage data. For example, the sequence number may be a number that is incremented every time the usage data is changed, or at intervals while the usage data is open for writing.

Where the usage data is used to determine compliance with limits in the license, and the sequence number is distinct from the usage number, measures may be taken to prevent a user from editing the saved data so as to change the usage data without also changing the sequence number. For example, the combined usage data and sequence number may be encrypted or hashed.

The interval at which the sequence number is saved to protected storage may be chosen to meet the requirements of a particular case. The interval is preferably sufficiently long to avoid undue burden on the server managing the license data, but short compared with the expected duration of the license, so that rolling back the usage from a state just before one save to a state just after the immediately previous save does not gain the user enough to be worth while. Where the usage data is in a form that cannot easily be rolled back while it is open for writing (For example, some databases must be closed before they can be restored to an earlier state.) the sequence number may be saved to protected storage whenever the usage data is transitioned to a state that can be rolled back.

The sequence number is preferably sufficiently large to eliminate the risk of the sequence number reaching its maximum value and rolling over to zero. The sequence number may be sufficiently large that it will not roll over within the expected lifetime of the computer on which the usage data is stored. For example, a 32-bit number incremented by 1 once a second will take more than a century to roll over. A 64-bit number is expected to be enough for any practical system.

The speed advantage of the illustrated system arises primarily when saving to the protected storage is significantly slower than saving the usage data to unprotected storage. For example, the protected storage may be on a physically slow device, such as an external hardware device, a BIOS chip that is not easily writable, or a separate network server that is connected only over a relatively slow link. The protected storage may be in a location that requires additional procedures to access, for example, outside the normal disk partition area, in a hidden file or directory and/or a system file or directory, or in the Windows Registry of a MICROSOFT WINDOWS operating system. The protected storage may be concealed or encrypted in a way that requires extra computation or manipulation, for example, by being disguised in the filename, timestamp, or other metadata of a file, or by steganography in a picture, video, or other data file. Two or more of these expedients may be combined to increase security.

BRIEF DESCRIPTION OF THE DRAWINGS

The above and other aspects, features, and advantages will be more apparent from the following more particular description thereof, presented in conjunction with the following drawings wherein.

DETAILED DESCRIPTION OF THE DRAWINGS

Figure 1:
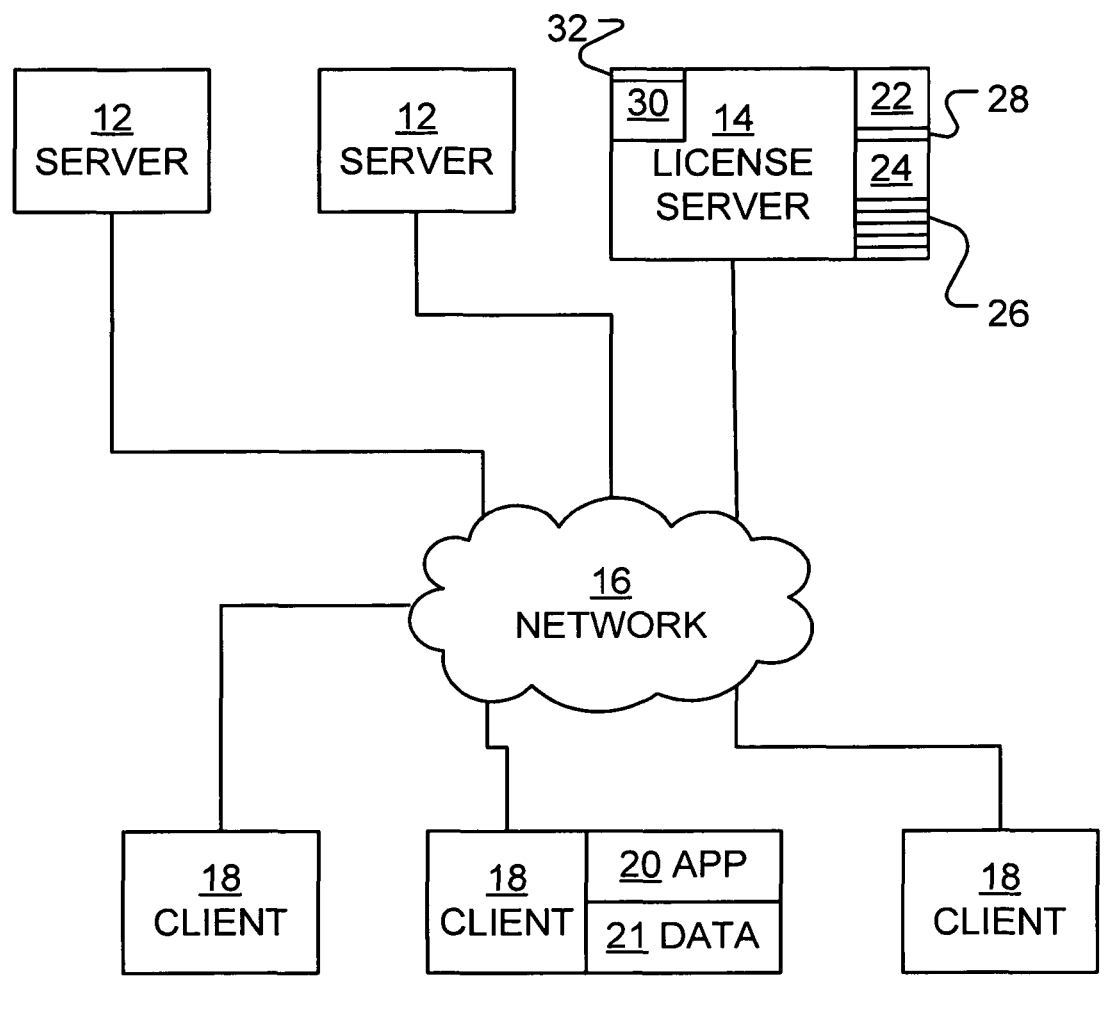
FIG. 1 is a schematic diagram of a computer network.

Referring to the accompanying drawings, and initially to FIG. 1, one embodiment of a computer system, indicated generally by the reference number 10, comprises one or more servers 12, 14 connected by a network 16 to client computers 18. The client computers 18 run application software 20 subject to licenses that restrict, or require monitoring of, the amount of usage of items such as data 21 controlled by the application software 20 or the application software 20 itself.

The licenses are managed by license management software 22 on a license server 14, which is one of the servers 12, 14 in the system 10. The license management software 22 maintains a database 24, in which it records usage data 26 reported by the application software 20. The licenses may restrict the number of executions of the application software 20, or the number of times a specific function may be used. For example, a copyright license may restrict the number of pages that can be printed from a specific document, either in total or over a period of time. The licenses may require renewal after a certain amount of use of the application software 20 or data 21, or may require payments dependent on the amount of use.

The database 24 also includes a sequence value 28 in the form of a sequence number. The sequence number 28 may be stored in a separate table in a relational database 24, as the first record in a flat file database 24 or in another convenient form or location. The sequence number is sufficiently large that at any reasonable rate of increment, it will not roll over to its initial value within the expected life of any component of the system 10. In an embodiment, the sequence number 28 is a 64 bit value, or the equivalent thereof.

The license server 14 also comprises protected storage 30, to and from which the license management software 22 can write and read a copy 32 of the sequence number 28. In an embodiment, access, and especially writing, to the protected storage 30 is much slower than access to the database 24. In another embodiment, the capacity of the protected storage 30 is too small to contain the database 24, and could not easily be increased to contain the database 24.

The copy 32 of the sequence number in the protected storage 30 is stored as "persistence data" that remains present even if the license management software 22 is uninstalled and reinstalled. Modern software is typically provided with either an "uninstall" program or "uninstall" information for an "uninstall" utility program included in the operating system that enables the software to be removed from the system as completely and efficiently as possible. The copy 32 and the database 24 are then not included in the uninstall program's list of files it should remove when uninstalling the license management software 22. The copy 32 of the sequence number in the protected storage 30 is concealed in such a manner that the ordinary user cannot easily find it, and/or encrypted, authenticated, or otherwise controlled so that the ordinary user cannot easily alter or delete it.

Examples of protected physical locations for the protected storage 30 include a hard disk area outside a normal disk partition or otherwise not readily accessible to the normal operating system, a memory area of a BIOS device, a Trusted Platform Module (TPM) chip, an external attached memory or other hardware device, and another server 12 on the network 16 connected to the license server 14. Examples of hidden or inaccessible logical locations for the protected storage 30 include hidden and/or system files or directories, and complex communal data 21 structures such as the Windows Registry on a MICROSOFT WINDOWS®, version 95 or later, operating system. Examples of concealed or encrypted data 21 for the protected storage 30 include encoding the sequence number into file names, date/time stamps, or other metadata, and steganography in video, picture, or other large data files 21. The skilled person will understand how to use two or more of these techniques for additional security.

Figure 2:
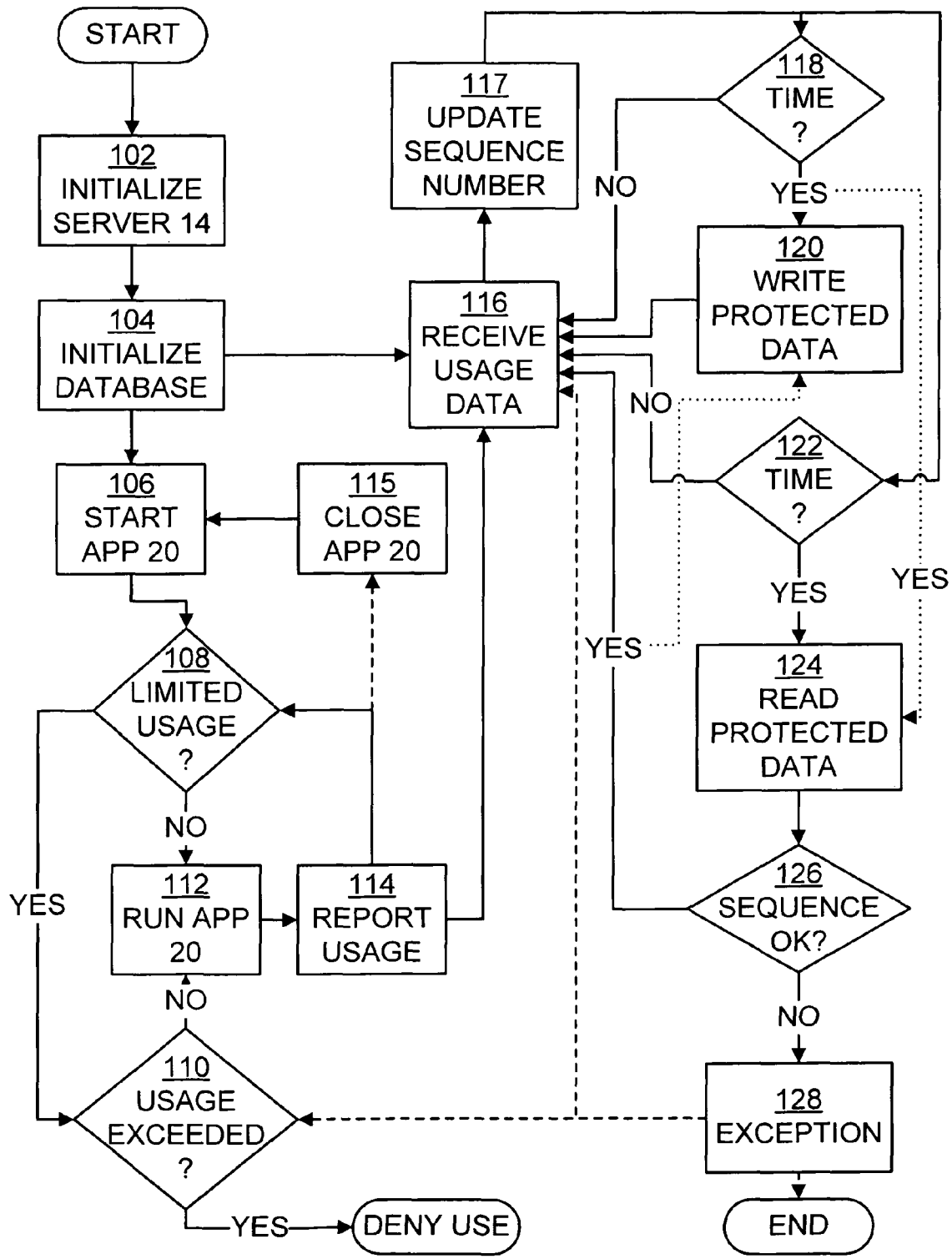
FIG. 2 is a flow-chart of a process for monitoring against rollback.

Referring also to FIG. 2, in one embodiment of a process according to the invention, in step 102 the license server 14 and the license management software 22 are initialized, and in step 104 the database 24 is initialized. At the end of this initialization, the license server 14 and the license management software 22 are running, the database 24 is open for writing by the license management software 22, the database 24 contains initial usage data 26 for at least one instance of at least one application software program 20 and/or at least one data file 21, and the database 24 and the protected storage 30 contain identical values of the sequence number 28. Additional application software programs 20 and/or data files 21 may be added to the database 24 as they are added to the system 10. Where application software programs 20 and/or data files 21, or instances thereof, are removed from the system 10, they are retained in the database 24, to guard against attempts to reset the usage by deleting and reinstalling an application software program 20 or data file 21.

In step 106, application software 20 is started. If the application software 20, or a data file 21 that it attempts to access, is subject to a limit on usage, as symbolized by decision step 108, the application software 20 may proceed to step 110 and interrogate the license management software 22 to confirm that the usage limit has not been reached before proceeding. If the database 24 shows that a usage limit has been reached, the license management software 22 may report negatively to the application software 20, which may refuse to run, refuse to access the affected data file 21, display an error message to a user or console operator, and/or take other appropriate action.

Assuming that any necessary authorization has been obtained in step 110, the process proceeds to step 112, where the application software 20 runs.

In step 114, the application software 20 is programmed to report to the license management software 22 whatever information the license management software 22 requires in order to maintain sufficient and accurate usage data 26. When the usage data 26 relates to specific events, the application software 20 may report such events as soon as they occur. For example, if the number of pages printed from a document is required data 21, the application software 20 may report to the license management software 22 whenever a print command is processed. Alternatively, or in addition, such data 21 may be reported from time to time, and/or when the application software 20 stops running, as may be appropriate. When the usage data 26 relates to elapsed time, the application software 20 may report such time at intervals while it is running, and/or when it stops running. As shown in FIG. 2 by the loop from step 114 back to decision step 108, when the license limits usage, the application software 20 may be programmed to contact the license management software 22 to confirm that a limit has not already been reached before proceeding with further use. A final usage report is sent immediately before the application software 20 is closed in step 115.

Although not explicitly shown in FIGS. 1 and 2, there may be multiple application software programs 20, either different programs or different instances of the same program, running on multiple client computers 18, and reporting to the license management software 22 on their own usage or on the usage of one or more data files 21.

In step 116, the license management software 22 receives, and saves in the database 24, usage data records 26 for all instances of the application software 20 and/or for all instances of data 21 that the license management software 22 is monitoring together with a sequence number 28. A single sequence number 28 may be used for all stored usage data 26 in usage database 24, or each application software program 20 and/or data file 21 may have a unique sequence number 28 associated with it. Alternatively, a group of application software programs 20 may have a single sequence number 28, with other software 20 and/or data 21 having a different sequence number or numbers 28. For example, all the software 20 and/or data 21 on the system 10 supplied by one software vendor may have its own single sequence number. License management software 22 may handle only one sequence number 28 for all licenses it is monitoring, or may be able to manage multiple sequence numbers 28.

In step 117, the license management software 22 advances the sequence number 28 by incrementing the sequence number whenever any of the usage data records 26 is updated. The increment may be 1, or another reasonably small number.

The database 24 or its contents are structured so that it is not possible, or is very difficult, to restore an earlier state of the usage data 26 while retaining the current value of the sequence number 28. For example, the stored data may be encrypted or encoded. The data may be in a table "obfuscated" by giving the table itself, and/or the individual columns and rows, misleading or uninformative names, so that the ordinary user cannot recognize the data. The database may have an unorthodox structure, so that an ordinary database management program cannot even recognize it as a database. The database 24 may store a hash value for the combined usage data 26 and sequence number 28 generated using an encryption key that only the license management software 22 has access to. The hash value is then updated whenever the database 24 is updated. Alternatively, the database 24 may be protected at a level that an ordinary user cannot override so that the license management software 22 has exclusive write access to the database 24. Two or more of these and/or other measures may be combined to improve security.

In step 120, the license management software 22 is programmed to write the sequence number 28 to the protected storage 30 as copy 32 at intervals while the system 10 is running, as shown by decision step 118 in FIG. 2. The license management software 22 may write to the protected storage 30 at irregular, preferably random or pseudorandom, intervals to guard against the stratagem of backing up the database 24 immediately after a write to protected storage 30 and restoring the database 24 immediately before the next write to protected storage 30, thus canceling all or almost all of the usage recorded in the intervening period. However, where the database 24 cannot be easily restored without disrupting its normal operation, that stratagem may be impractical. For example, some server databases cannot be restored without stopping and restarting the server.

The intervals at which the license management software 22 writes to the protected storage 30 are chosen to be a compromise between short intervals (minimizing the amount of usage that a user can suppress by tampering with the database 24 without disrupting the sequence of the sequence numbers) and long intervals (minimizing the extra load on the license server 14 from the writes to protected storage 30). In any event, the intervals are chosen to be small compared with the expected period for which a license remains valid.

In step 124, the license management software 22 is also programmed to read the copy 32 of the sequence number 26 from the protected storage 30 on startup, and at intervals while running, as shown by decision step 122 in FIG. 2. In an embodiment, as symbolized by the dotted lines in FIG. 2, the license management software 22 always reads the copy 32 from the protected storage 30 immediately before writing the sequence number 28 to the protected storage 30. At other times, the reads 122, 124 may occur at independent times from the writes 118, 120, and in a multi-threading license management software 22 the reads and writes may be run as separate threads. Other strategies are also possible.

In step 126, the license management software 22 compares the copy 32 of sequence number 28 just read from the protected storage 30 with the current sequence number 28 to determine whether the comparison is consistent with normal usage of the database 24. The sequence number in protected storage 30 should be the same as, or slightly earlier than, the current sequence number 28 in the database 24. If the "current" sequence number 28 is earlier, the database 24 may have been improperly restored to an earlier value. If the sequence numbers are completely different, either the database 24 or the protected storage 30 may have been tampered with. The exact criterion may be dependent on the particular system 10. For example, if the copy 32 is first read and then updated every time the sequence number 28 is updated, then the copy 32 as read should be exactly equal to the sequence number 28 as it stood before the current update. If the interval between reads and writes of the copy 32 is greater than the minimum interval between updates of the sequence number 28, then a greater difference between the sequence number 28 and the copy 32 may be expected. A maximum value and a minimum value (which may be zero) for the difference may be determined for a specific system 10.

If the result of the comparison is acceptable, the license management software 22 returns to step 116, and normal service continues.

If the comparison fails because the difference is outside the range deemed consistent with normal operation, or because the secure copy 32 is missing or corrupted, the license management software 22 may take appropriate action in step 128. For example, the license management software 22 may log or report the error so that a penalty becomes payable. The discrepant values of the sequence number 28 and 32 may be used, or logged for later use, to estimate the amount of the rollback in order to assess the amount of the penalty. As symbolized by the dashed lines in FIG. 2, the license management software 22 may signal to application software programs 20 that they, or their data 21, have exceeded maximum usage so that the application programs deny further use to their users, or otherwise end normal operation of the parts of system 10 that the license management software 22 is monitoring. Alternatively, the license management software 22 may merely record details of the exception and resume monitoring. Where the license management software 22 is monitoring a variety of application software 20 and/or data files 21, the license management software 22 may force some application software 20 and/or data files 21 to close while continuing to monitor other application software 20 and/or data files 21.

Although specific embodiments have been described, the skilled reader will understand how features of different embodiments may be combined and substituted without departing from the scope of the invention.

For example, as shown in FIG. 1 the application software 20 and the data file 21 are on a client computer 18, while the license management software 22 is on a central license server 14. Alternatively, the application software 20 and/or the data file 21 may be on the same server as the license management software 22 or on another server 12, and may be shared by more than one client.

As shown in FIG. 1 the license management software 22 is a central service supporting numerous application software programs 20 and/or data files 21. Alternatively, the license management software 22 may serve a single client computer 18 or a single application software program 20 and/or data file 21, and/or may be running on the client computer 18 that it serves. Where the license management software 22 serves only a single application software program 20, the license management software 22 may be wholly or partially embedded into the application software 20. Where the license management software 22 is on the client computer 18, the database 24 may be on the same client computer 18, or may be on the server 14 acting as a database server.

As shown in FIG. 2, the sequence value 28 is represented as a number, and is incremented by increasing the number. However, another form of sequence value 28 may be used that can be advanced through a large number of distinct states in a definite sequence that permits comparison of the current sequence value 28 with the copy 32 of the sequence value 28 in protected storage 30.

The preceding description of the presently contemplated best mode of practicing the disclosed system is not to be taken in a limiting sense, but is made merely for the purpose of describing general principles of operation of the disclosed system. The full scope of protection should be determined with reference to the claims.

The invention claimed is:

1. A method of detecting rollback of usage data, comprising:
   recording usage data and a sequence value in a database;
   saving a copy of the sequence value to protected storage other than said database other than while saving of a copy of an item the usage of which was recorded in the database;
   advancing the sequence value in the database;
   comparing the copy of the sequence value in the protected storage with the sequence value in the database;
   determining whether the result of the comparison is consistent with normal operation of the database since a previous save to the protected storage; and
   repeating the saving, advancing, and comparing at intervals while running an item the usage of which was recorded in the database.

2. A method according to claim 1, further comprising advancing the sequence value in the database more frequently than saving the copy to the protected storage.

3. A method according to claim 1, further comprising saving the copy to the protected storage at irregular time intervals.

4. A method according to claim 1, further comprising recording usage data relating to use of a plurality of items in use in a common database with a common sequence value.

5. A method according to claim 1, further comprising retaining the copy of the sequence value in the protected storage after uninstallation of a program that saved the copy to the protected storage.

6. A method according to claim 1 further comprising, when the result of the comparison is not consistent with normal operation of the database, preventing continued use of an item the usage of which was recorded in the database.

7. A method according to claim 1, wherein the protected storage comprises at least one of: a disk area outside normal operating system use; external attached memory storage; a BIOS memory area; a Trusted Platform Module (TPM) chip; and the Registry of a MICROSOFT WINDOWS® operating system.

8. A system for detecting rollback of usage data, comprising:
   protected computer readable data storage; and
   a computer provided with
      a processor; and
      computer readable storage media containing:
         a database other than said protected computer readable data storage arranged in use to contain usage data and a sequence value; and
      software arranged in use:
         to receive usage data, record the usage data in the database, and to advance the sequence value in the database;
         to repeatedly copy the sequence value from the database into the protected computer readable data storage, said protected computer readable data storage not containing a copy of an item the usage of which was recorded in the database;
         to compare the copy of the sequence value in the protected computer readable data storage with the sequence value in the database;
         to determine whether the result of the comparison is consistent with normal operation of the database since a previous save to the protected computer readable data storage; and
         to repeat the saving, advancing, and comparing at intervals during ordinary use of an item the usage of which was recorded in the database.

9. A system according to claim 8, further comprising at least one computer comprising computer readable storage media containing application software arranged in use to report usage of at least one item to said software arranged in use to receive usage data.

10. A system according to claim 9, wherein said at least one item comprises at least one of said application software and data accessible by use of said application software.

11. A system according to claim 8, wherein the protected storage comprises at least one of: a disk area outside normal operating system use; external attached memory storage; a BIOS memory area; a Trusted Platform Module (TPM) chip; and the Registry of a MICROSOFT WINDOWS® operating system.

12. Non-transitory computer readable storage media containing instructions arranged in use to cause a computer to:
   record usage data in a database;
   repeatedly advance a sequence value in the database;
   repeatedly saving a copy of the sequence value to protected storage other than the database apart from any backup of an item the usage of which was recorded in the database;
   compare the copy of the sequence value in the protected storage with the sequence value in the database;
   determine whether the result of the comparison is consistent with normal operation of the database since a previous save to protected storage; and
   repeat the saving, advancing, and comparing at intervals while running an item the usage of which was recorded in the database.

13. Non-transitory computer readable storage media according to claim 12, further containing instructions arranged in use to cause the computer to advance the sequence value in the database more frequently than saving the copy to the protected storage.

14. Non-transitory computer readable storage media according to claim 12, further containing instructions arranged in use to cause the computer to save the copy to the protected storage at irregular time intervals.

15. Non-transitory computer readable storage media according to claim 12, further containing instructions arranged in use to cause the computer to recording usage data relating to use of a plurality of items in use in a common database with a common sequence value.

16. Non-transitory computer readable storage media according to claim 12, further containing instructions arranged in use to cause the computer to uninstall a program that saved the copy of the sequence value to the protected storage while leaving the copy in the protected storage after the uninstallation.

17. Non-transitory computer readable storage media according to claim 12, further containing instructions arranged in use to cause the computer to prevent continued use of an item the usage of which was recorded in the database when the result of the comparison is not consistent with normal operation of the database.

18. Non-transitory computer readable storage media according to claim 12, further containing instructions arranged in use to cause the computer to use as said protected storage at least one of: a disk area outside normal operating system use; external attached memory storage; a BIOS memory area; a Trusted Platform Module (TPM) chip; and the Registry of a MICROSOFT WINDOWS® operating system.

* * * * *